United States Patent
Ding et al.

(10) Patent No.: US 12,517,410 B2
(45) Date of Patent: Jan. 6, 2026

(54) COLOR FILTER ARRAY AND COLOR ELECTROPHORETIC DISPLAY HAVING THE SAME

(71) Applicant: E Ink Holdings Inc., Hsinchu (TW)

(72) Inventors: Jau-Min Ding, Hsinchu (TW); Po-Yuan Lo, Hsinchu (TW); Ian French, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 277 days.

(21) Appl. No.: 18/048,438

(22) Filed: Oct. 20, 2022

(65) Prior Publication Data

US 2023/0185149 A1 Jun. 15, 2023

(30) Foreign Application Priority Data

Dec. 10, 2021 (TW) .................. 110146203

(51) Int. Cl.
*G02F 1/157* (2006.01)
*G02B 5/20* (2006.01)
*G02F 1/1335* (2006.01)

(52) U.S. Cl.
CPC ............. *G02F 1/157* (2013.01); *G02B 5/201* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 4,251,136 A | * | 2/1981 | Miner .................... G09G 3/367 345/91 |
| 5,144,288 A | * | 9/1992 | Hamada ............ G02F 1/133514 345/589 |
| 6,529,239 B1 | | 3/2003 | Dyck et al. |
| 8,902,153 B2 | | 12/2014 | Bouchard et al. |
| 2005/0024560 A1 | | 2/2005 | Yang et al. |

(Continued)

FOREIGN PATENT DOCUMENTS

| CN | 102393592 A | 3/2012 |
|---|---|---|
| CN | 106383424 A | 2/2017 |

(Continued)

OTHER PUBLICATIONS

The corresponding office action of TW application No. 110146203 issued on Aug. 11, 2022.

(Continued)

*Primary Examiner* — Ryan Crockett
(74) *Attorney, Agent, or Firm* — CKC & Partners Co., LLC

(57) ABSTRACT

A color filter array includes a first color resist having a first color, a second color resist having a second color different from the first color, and a third color resist having a second color different from the first color and the second color. The first color resist includes multiple sections. The second color resist includes multiple sections. The third color resist includes multiple sections. When viewed in a plan view, the sections of the first color resist collectively arranged as a continuous S shape, the sections of the second color resist collectively arranged as a continuous S shape, and the sections of the third color resist collectively arranged as a continuous S shape.

15 Claims, 10 Drawing Sheets

(56) References Cited

U.S. PATENT DOCUMENTS

2007/0109474 A1\* 5/2007 Yang ................. G02F 1/133514
349/114
2016/0204094 A1\* 7/2016 Yang ................... H10K 59/353
257/773

FOREIGN PATENT DOCUMENTS

TW 201500825 A 1/2015
WO WO-2012157536 A1 \* 11/2012 ........... G02F 1/1345

OTHER PUBLICATIONS

The office action of corresponding CN application No. 202111504880.2 issued on May 20, 2025.

\* cited by examiner

|  | control group one | | | control group two | | | color electrophoretic display (Fig. 1) | | |
| --- | --- | --- | --- | --- | --- | --- | --- | --- | --- |
|  | L* | a* | b* | L* | a* | b* | L* | a* | b* |
| Red | 29.3 | 8.6 | 1.5 | 30.1 | 8.7 | 1.4 | 28.4 | 7.9 | 1.1 |
| Green | 33.5 | -12.8 | 5.5 | 34.1 | -12.9 | 5.4 | 32.3 | -11.6 | 4.7 |
| Blue | 29.2 | -3.2 | -11.9 | 30.4 | -2.4 | -10 | 28 | -2.9 | -11.6 |
| Cyan | 43.8 | -11.8 | -4.2 | 45.8 | -11.6 | -2.6 | 43.7 | -11 | -4.3 |
| Magenta | 40.5 | 4.5 | -7.5 | 42.6 | 5.1 | -6 | 40.5 | 4.3 | -7.2 |
| Yellow | 44 | -3 | 6 | 45.2 | -3.1 | 5.5 | 43.4 | -2.6 | 5.6 |
| Black | 15.3 | -1.3 | -2.1 | 14.4 | -1 | -1.7 | 13.7 | -1 | -1.9 |
| White | 53 | -4.8 | -1.8 | 54.9 | -4.5 | -0.6 | 53.9 | -4.4 | -1.9 |
| Reflectance (white) |  | 21.1 | |  | 22.8 | |  | 21.9 | |
| Reflectance (black) |  | 1.96 | |  | 1.81 | |  | 1.68 | |
| Contrast |  | 10.8 | |  | 12.6 | |  | 13 | |
| Gamma value |  | 3377 | |  | 3100 | |  | 3143 | |
| Color difference |  | 10.49 | |  | 9.84 | |  | 9.8 | |
| NTSC color gamut range (%) |  | 2.23% | |  | 1.88% | |  | 2.00% | |

Fig. 10

COLOR FILTER ARRAY AND COLOR ELECTROPHORETIC DISPLAY HAVING THE SAME

CROSS-REFERENCE TO RELATED APPLICATION

This application claims priority to Taiwan Application Serial Number 110146203, filed Dec. 10, 2021, which is herein incorporated by reference in its entirety.

BACKGROUND

Field of Invention

The present invention relates to a color filter array and a color electrophoretic display.

Description of Related Art

A printed color filter layer is used in a current color electrophoretic display to filter the light reflected by the display medium layer. When an area of a color resist of the color filter layer is not large enough, color performance of the color electrophoretic display will be degraded. If the area of the color resist is increased, grain pattern or texture may appear, and therefore the reading comfortability may be affected. In addition, reducing the area of the color filter layer may cause reduction of the color gamut range of the display or even affect the performance of its white balance.

Accordingly, it is still under development for the display industry to provide a color filter array to overcome the aforementioned problems.

SUMMARY

The invention provides a color filter array.

In some embodiments, the color filter array includes a first color resist having a first color, a second color resist having a second color different from the first color, and a third color resist having a second color different from the first color and the second color. The first color resist includes multiple sections. The second color resist includes multiple sections. The third color resist includes multiple sections. When viewed in a plan view, the sections of the first color resist collectively arranged as a continuous S shape, the sections of the second color resist collectively arranged as a continuous S shape, and the sections of the third color resist collectively arranged as a continuous S shape.

In some embodiments, the color filter array includes multiple rows arranged along a first direction and multiple columns arranged along a second direction, and the first direction is substantially perpendicular to the second direction. The sections of the first color resist include two first portions and two second portions. The two first portions are at least located at a first column, the two second portions are respectively located at a second column and a third column corresponding to two opposite sides of the two first portions. The sections of the first color resist are alternatively arranged along the first direction.

In some embodiments, the two first portions and the two second portions are located at different rows respectively, and one of the two first portions is located between the two second portions.

In some embodiments, each of the two second portions of the first color resist has a first side and a second side opposite to the first side and has a third side and a fourth side opposite to the third side. The first side is in parallel with the second side along the second direction, and the third side is in parallel with the fourth side along the first direction. The two first portions of the first color resist are respectively located at a first corner and a second corner of one of the two second portions, the first corner is a junction between the first side and the third side of the second portion, and the second corner is a junction between the first side and the fourth side of the second portion.

In some embodiments, each of the two first portions of the first color resist has a first side and a second side opposite to the first side and has a third side and a fourth side opposite to the third side. The first side is in parallel with the second side along the second direction, and the third side is in parallel with the fourth side along the first direction. The two second portions of the first color resist are respectively located at a third corner and a fourth corner of one of the two first portions, the third corner is a junction between the second side and the third side of the second portion, and the fourth corner is a junction between the first side and the fourth side of the second portion.

In some embodiments, the sections of the first color resist have a first total area, the sections of the second color resist have a second total area, and the first total area substantially equals to the second total area.

In some embodiments, the sections of the first color resist have two first portions and two second portions, the sections of the second color resist have two first portions and two second portions, areas of the two first portions of the first color resist are different from areas of the two first portions of the second color resist.

Another aspect of the present disclosure is a color electrophoretic display.

In some embodiments, the color electrophoretic display includes a display region, a pixel array, a display medium layer, and a color filter array. The display region includes multiple sub-pixel regions. The pixel array corresponds to the display region in position. The display medium layer is located on the pixel array. The color filter array includes multiple rows arranged along a first direction and multiple columns arranged along a second direction, and the first direction is substantially perpendicular to the second direction. Each of the sub-pixel regions are corresponds to the columns and the rows of the color filter array.

In some embodiments, the sections of the first color resist include two first portions and two second portions, an area of each of the two first portions is smaller than or equals to an area of each of the two second portions, and an orthogonal projection of each of the two first portions corresponds to one sub-pixel region.

In some embodiments, the sections of the first color resist include two first portions and two second portions, the two first portions are at least located at a first column, the two second portions are respectively located at a second column and a third column corresponding to two opposite sides of the two first portions, and the sections of the first color resist are alternatively arranged along the first direction.

In some embodiments, the two first portions and the two second portions are located at different rows respectively, and one of the two first portions is located between the two second portions.

In some embodiments, each of the two second portions of the first color resist has a first side and a second side opposite to the first side and has a third side and a fourth side opposite to the third side. The first side is in parallel with the second side along the second direction, and the third side is in parallel with the fourth side along the first direction. The two first portions of the first color resist are respectively located at a first corner and a second corner of one of the two second portions, the first corner is a junction between the first side and the third side of the second portion, and the second corner is a junction between the first side and the fourth side of the second portion.

In some embodiments, each of the two second portions of the first color resist has a first side and a second side opposite to the first side and has a third side and a fourth side opposite to the third side. The first side is in parallel with the second side along the second direction, and the third side is in parallel with the fourth side along the first direction. The two second portions of the first color resist are respectively located at a third corner and a fourth corner of one of the two first portions, the third corner is a junction between the second side and the third side of the second portion, and the fourth corner is a junction between the first side and the fourth side of the second portion.

In some embodiments, the sections of the first color resist have a first total area, the sections of the second color resist have a second total area, and the first total area substantially equals to the second total area.

In some embodiments, the sections of the first color resist include two first portions and two second portions, the sections of the second color resist include two first portions and two second portions, areas of the two first portions of the first color resist are different from areas of the two first portions of the second color resist.

In the aforementioned embodiments, the color gamut region and the white balance of a display can be maintained by using the color filter array having multiple sections arranged as a continuous S shape. Separating the color resist into multiple sections that are continuous without overlapping helps to improve the overall brightness of the display screen, as well as to reduce the probability of showing a recognizable texture. Further, the S shape pattern of the color resist arrangement is also designed to mimic a real paper fiber texture.

BRIEF DESCRIPTION OF THE DRAWINGS

The invention can be more fully understood by reading the following detailed description of the embodiment, with reference made to the accompanying drawings as follows:

FIG. 10 is a table of color performance of the color electrophoretic display in FIG. 1 and control groups.

DETAILED DESCRIPTION

Figure 1:
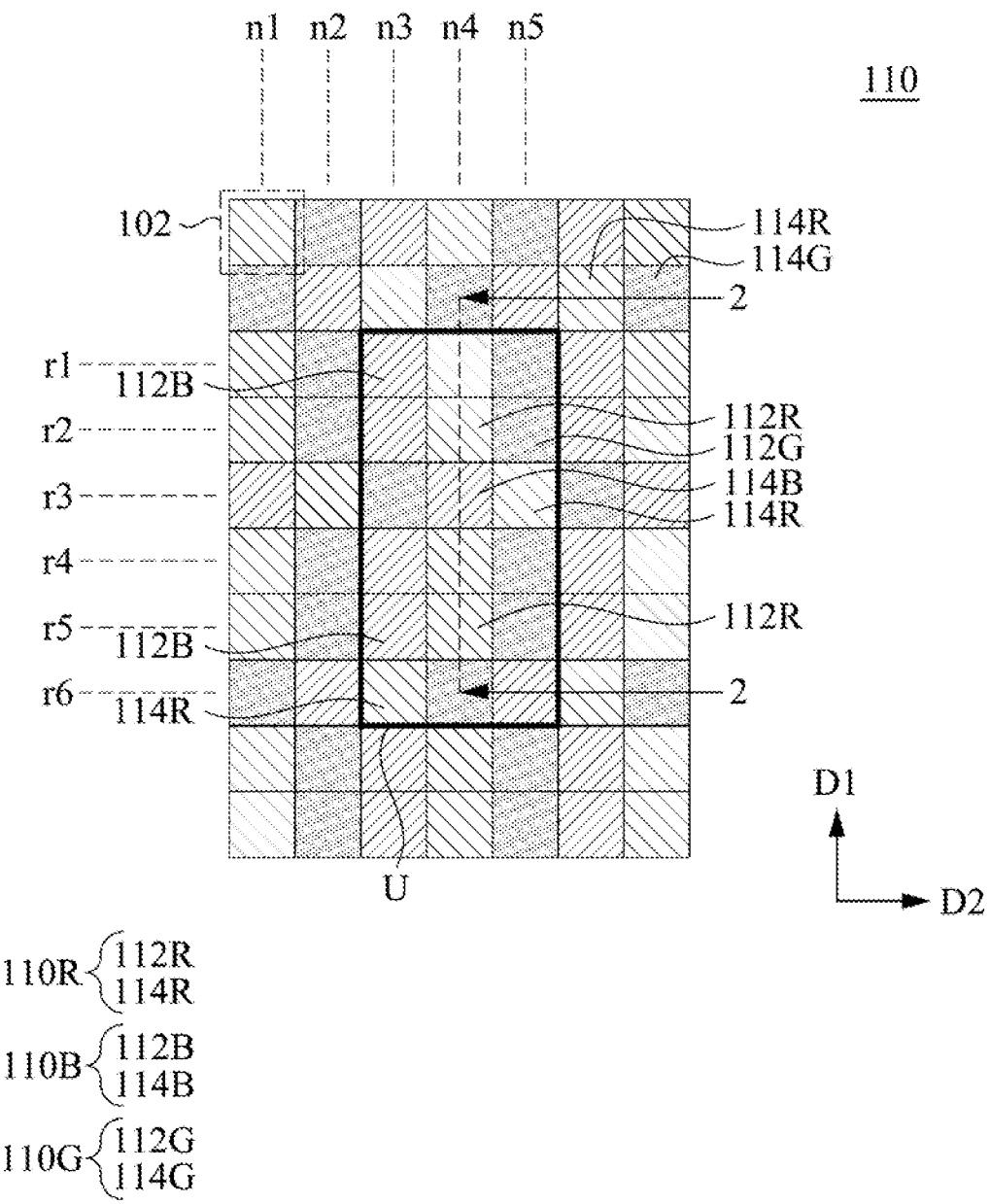
FIG. 1 is a top view of a color electrophoretic display according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
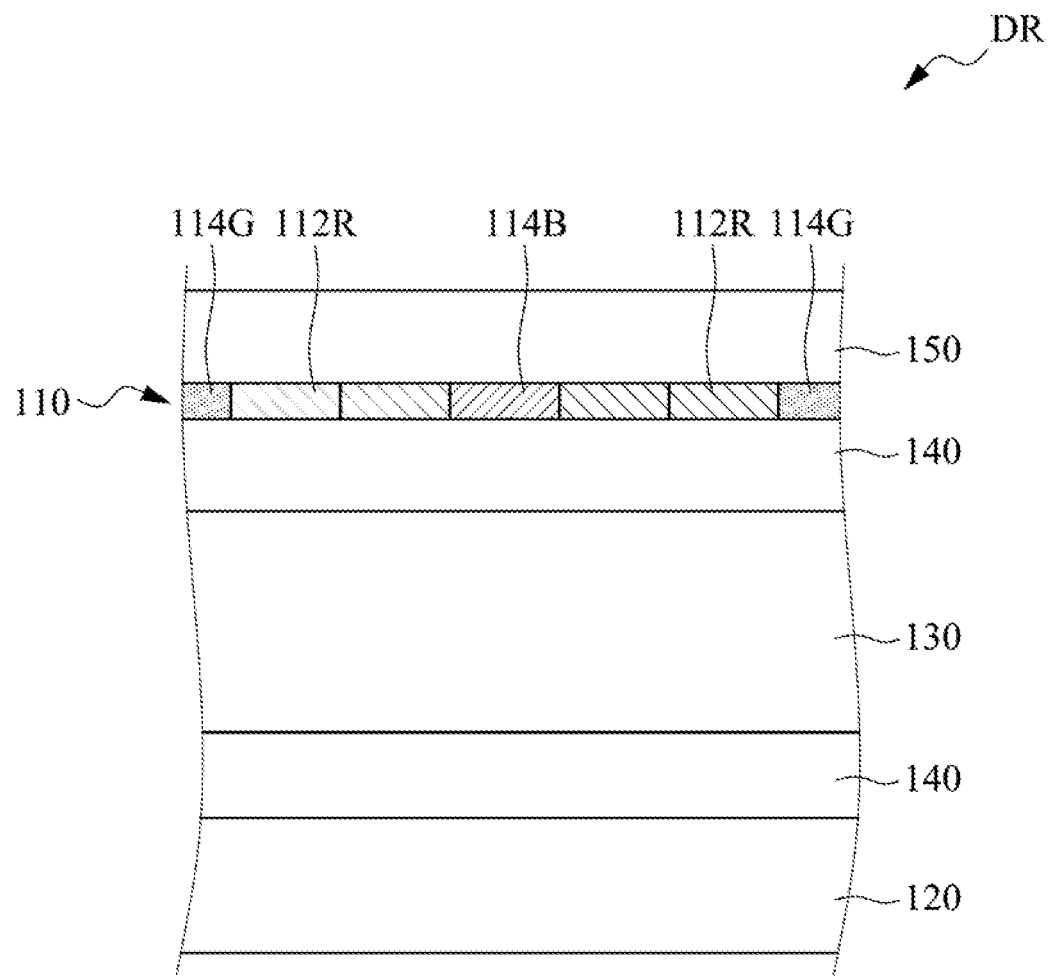
FIG. 2 is a cross-sectional view taken along line 2-2 in FIG. 1.

FIG. 1 is a top view of a color electrophoretic display 100 according to one embodiment of the present disclosure. FIG. 2 is a cross-sectional view taken along line 2-2 in FIG. 1. Reference is made to FIG. 1 and FIG. 2. The color filter array 110 includes a color filter array 110, a pixel array 120, and a display medium layer 130. The display medium layer 130 is located on the pixel array 120. The color electrophoretic display 100 includes a display region DR, and the display region DR includes multiple sub-pixel regions 102. The pixel array 120 corresponds to the sub-pixel regions 102 of the display region DR in position. In the present embodiment, the first direction D1 is the vertical direction, the second direction D2 is horizontal direction, and the first direction D1 is perpendicular to the second direction D2.

As shown in FIG. 2, the color electrophoretic display 100 further includes two adhesive layers 140 and a transparent substrate 150. The adhesive layers 140 are located between the pixel array 120 and the display medium layer 130 and between the color filter array 110 and the display medium layer 130. The transparent substrate 150 is located on the color filter array 110. The aforesaid structural configurations of the color filter array 110 and the display medium layer 130 can be adjusted based on practical requirements, but the present disclosure is not limited thereof. For clarity, the transparent substrate 150 is omitted in FIG. 1.

Reference is made to FIG. 1, the color filter array 110 includes multiple rows r1~r6 arranged along a first direction D1 and multiple columns n1~n5 arranged along a second direction D2, wherein the first direction D1 is substantially perpendicular to the second direction D2.

The color filter array 110 includes multiple first color resists 110R, multiple second color resists 110B, and multiple third color resists 110G. In the present disclosure, the first color resists 110R are red color resists, the second color resists 110B are blue color resists, the green color resists 110G are green color resists, but the present disclosure is not limited thereof. The first color resists 110R, the second color resists 110B, and the third color resists 110G respectively includes multiple sections. Each of the sections covers more than one of the sub-pixel regions 102. An area ratio of the sub-pixel regions 102 covered by the color resists can be adjusted based on practical requirements, and it is merely exemplary that the sub-pixel regions 102 is filled by the color resists.

In the present embodiment, the sections of the first color resists 110R includes first portions 112R and second portions 114R, the sections of the second color resists 110B includes first portions 112B and second portions 114B, and the sections of the third color resists 110G includes first portions 112G and second portions 114G. The sections of the first color resists 110R collectively arranged as a continuous S shape, the sections of the second color resists 110B collectively arranged as a continuous S shape, and the sections of the third color resists 110G collectively arranged as a continuous S shape. Area of each of the first portions 112R, 112B, 112G corresponds to two sub-pixels regions 102, and area of each of the second portions 114R, 114B, 114G corresponds to one sub-pixel region 102, but the present disclosure is not limited thereof. In other words, an orthogonal projection of each of the first portions 112R, 112B, 112G corresponds to two sub-pixel regions 102, and an orthogonal projection of each of the second portions 114R, 114B, 114G corresponds to one sub-pixel region 102.

In the present embodiment, a total area of the sections of a first color resist 110R substantially equals to a total area of the sections of a second color resist 110B. For example, a sum of the areas of the first portions 112R and the areas of the second portion 114R is a first total area, and the first total area is about six times of the area of the sub-pixel region 102. A sum of the area of the first portions 112B and the area of the second portion 114B is a second total area, and the second total area is about six times of the area of the sub-pixel region 102. A sum of the area of the first portions 112G and the area of the second portion 114G is substantially the same as the first total area and the second total area. As shown in the Figure, the color filter array 110 has filter pattern formed by repeated filter units U which including two first portions 112R, 112B, 112G and two second portions 114R, 114B, 114G.

Since the total area of the first color resist 110R, the total area of the second color resist 110B, and the total area of the third color resist 110G of the filter unit U are the same, such design may maintain color gamut region and white balance. Comparing to a conventional color resist which has a long strip shape, the continuous S shape arrangement formed by multiple sections can provide many portions (i.e., the second portions 114R, 114B, 114G) each corresponding to one sub-pixel region 102 without causing color gamut reduction problem due to small size color resists.

Figure 3:
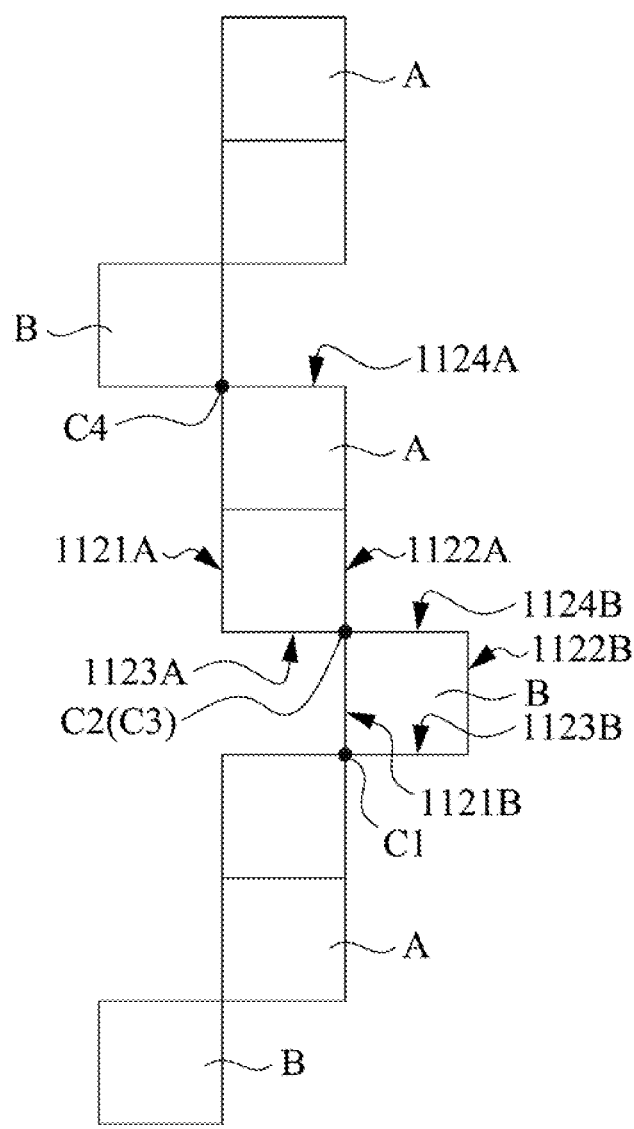
FIG. 3 is a partially enlarged view of FIG. 1.

Reference is made to FIG. 1 and FIG. 3. FIG. 3 is a partially enlarged view of FIG. 1. For example, the color resist in FIG. 3 can be any one of the first color resists 110R, the second color resists 110B, and the third color resists 110G. A S shape pattern 110S formed by three first portions A and three second portions B are illustrated in FIG. 3. As shown in the embodiment in FIG. 1, the first color resists 110R, the second color resists 110B, and the third color resists 110G of the color filter array 110 all have similar S shape patterns. In addition, the S shape patterns of the first color resists 110R, the second color resists 110B, and the third color resists 110G are arranged side by side, but the present disclosure is not limited thereof. Specifically, the first portions 112R, 112B, 112G are located at rows r1, r2, r4, and r5, and the second portions 114R, 114B, 114G are located at rows r3 and r6. In other embodiments, the S shape patterns can be alternatively arranged.

Reference is made FIG. 1, the first color resist 110R includes two first portions 112R located at the column n4 and two second portions 114R respectively located at the column n3 and the column n5 correspond to two opposite sides of the two first portions 112R. The aforesaid two first portions 112R and the two second portions 114R alternate with each other along the first direction D1. Specifically, the two second portions 114R and the two first portions 112R are alternatively arranged along the first direction D1, and the two first portions 112R and the two second portions 114R are respectively located at different columns. The two second portions 114R are respectively located at the row r3 and the row r6, and the two first portions 112R are respectively located at the rows r1~r2 and rows r4~r5. That is, one of the two first portions 112R is located between the two second portions 114R.

Reference is made to FIG. 3, each of the first portions A has a first side 1121A and a second side 1122A opposite to the first side 1121A and has a third side 1123A and a fourth side 1124A opposite to the third side 1123A. The first side 1121A is parallel with the second side 1122A along the second direction D2, and the third side 1123A is parallel with the fourth side 1124A along the first direction D1. Each of the second portions B has a first side 1121B and a second side 1122B opposite to the first side 1121B and has a third side 1123B and a fourth side 1124B opposite to the third side 1123B. The first side 1121B is parallel with the second side 1122B along the second direction D2, and the third side 1123B is parallel with the fourth side 1124B along the first direction D1.

The two first portions A are respectively located at a first corner C1 and a second corner C2 of one of the two second portions B. The first corner C1 is a junction between the first side 1121B and the third side 1123B of the second portion B, and the second corner C2 is a junction between the first side 1121B and the fourth side 1124B of the second portion B. The two second portions B are respectively located at a third corner C3 and a fourth corner C4 of one of the two first portions A, the third corner C3 is a junction between the second side 1122B and the third side 1123B of the second portion B, and the fourth corner C4 is a junction between the first side 1121B and the fourth side 1124B of the second portion B. In other words, the first portions A and the second portions B form the continuous S shape pattern 110S through being arranged diagonally. That is, sides of the first portions A facing the second portions B and sides of the second portions B facing the first portions A are not overlapped with each other. For example, the third side 1123A and the fourth side 1124B are spaced apart, and only the second corner C2 (the third corner C3) are connected.

Accordingly, the overall brightness of the display screen can be improved by separating the color resists into multiple sections that are continuous without overlapping, and therefore the occurrence probability of textures that can be recognized by human eyes can be reduced. In addition, the S shape patterns of the color resists are similar to the fiber texture of a real paper, and therefore the sections of the color resists can be less obvious when such design is used in the products such as E-book. As such, details of figures and texts can be emphasized in the display screen.

Figure 4:
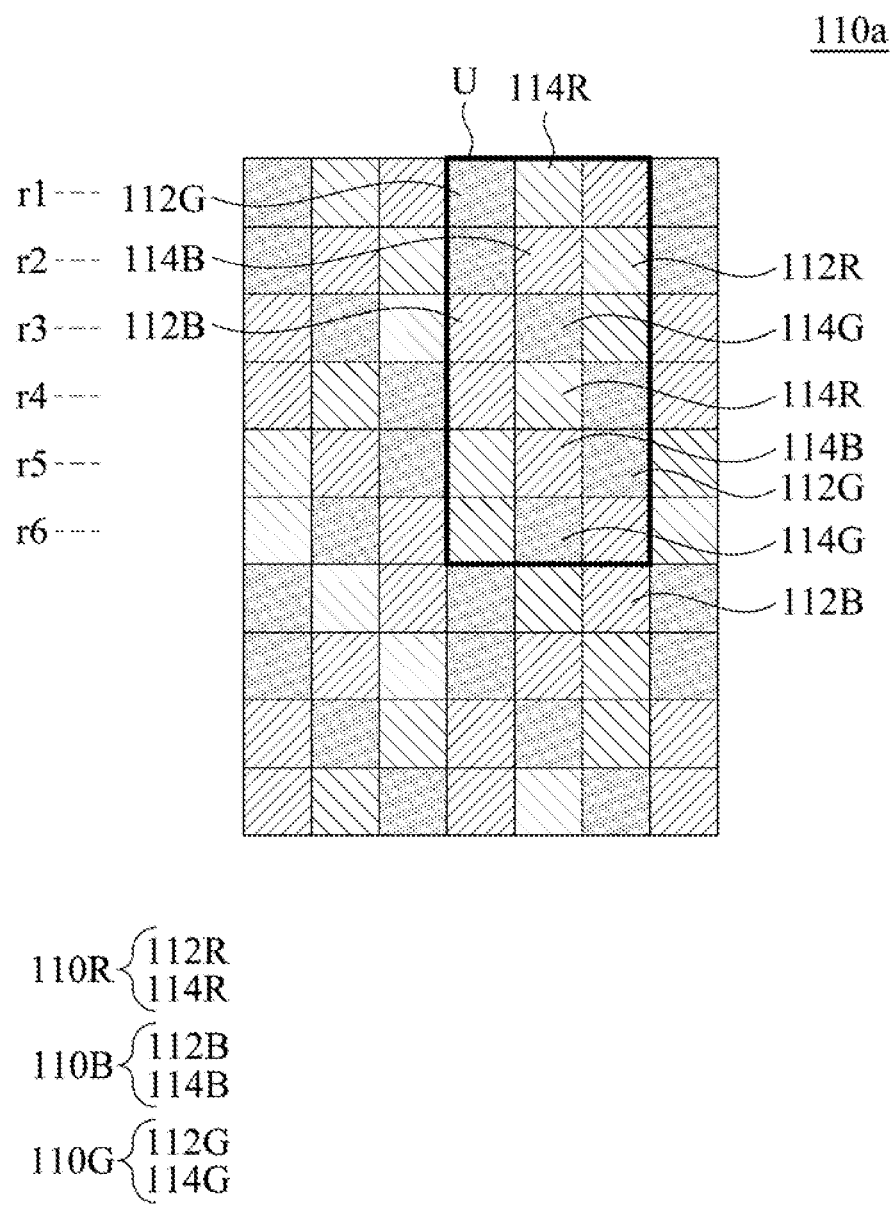
FIG. 4 is a top view of a color filter array according to one embodiment of the present disclosure.

FIG. 4 is a top view of a color filter array 110a according to one embodiment of the present disclosure. The color filter array 110a is substantially the same as the color filter array 110, and the difference is that the S shape patterns formed by the first color resists 110R, the second color resists 110b, and the third color resists 110G of the color filter array 110a alternate with each other. As shown in the filter unit U, the first portions 112R of the first color resist 110R are located at rows r2, r3, r5, and r6, and the second portions 114R are located at rows r1 and r4. The first portions 112b of the second color resist 110b are located at rows r1, r3, r4, and r6, and the second portions 114B are located at rows r2 and r5. The first portions 112G of the third color resist 110G are located at rows r1, r2, r4, r5, and the second portions 114G are located at rows r3 and r6. The color filter array 110a and the color filter array 110 have the same technique advantages, and the description will not be repeated hereinafter.

Figure 5:
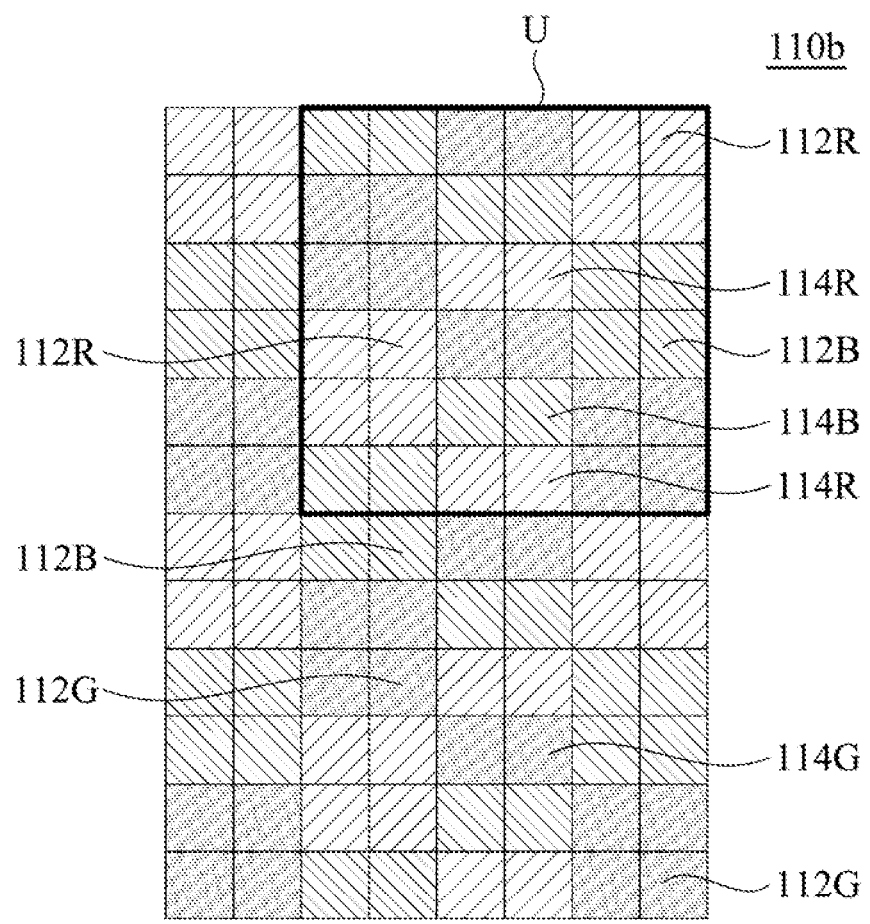
FIG. 5 is a top view of a color filter array according to one embodiment of the present disclosure.

FIG. 5 is a top view of a color filter array 100b according to one embodiment of the present disclosure. The color filter array 100b is substantially the same as the color filter array 110, and the difference is that the areas of the first portions 112R, 112B, 112G of the color filter array 100b each correspond to four sub-pixel regions 102, and the first portions 112R, 112B, 112G are each arranged as a 2×2 array. The areas of the second portions 114R, 114B, 114G of the color filter array 100b each correspond to two sub-pixel regions 102, and the second portions 114R, 1146, 114G are each arranged as a 1×2 array. In other words, the first portions 112R, 112B, 112G and the second portions 114R, 114B, 114G can have different areas respectively. The color filter array 110b and the color filter array 110 have the same technique advantages, and the description will not be repeated hereinafter.

Figure 6:
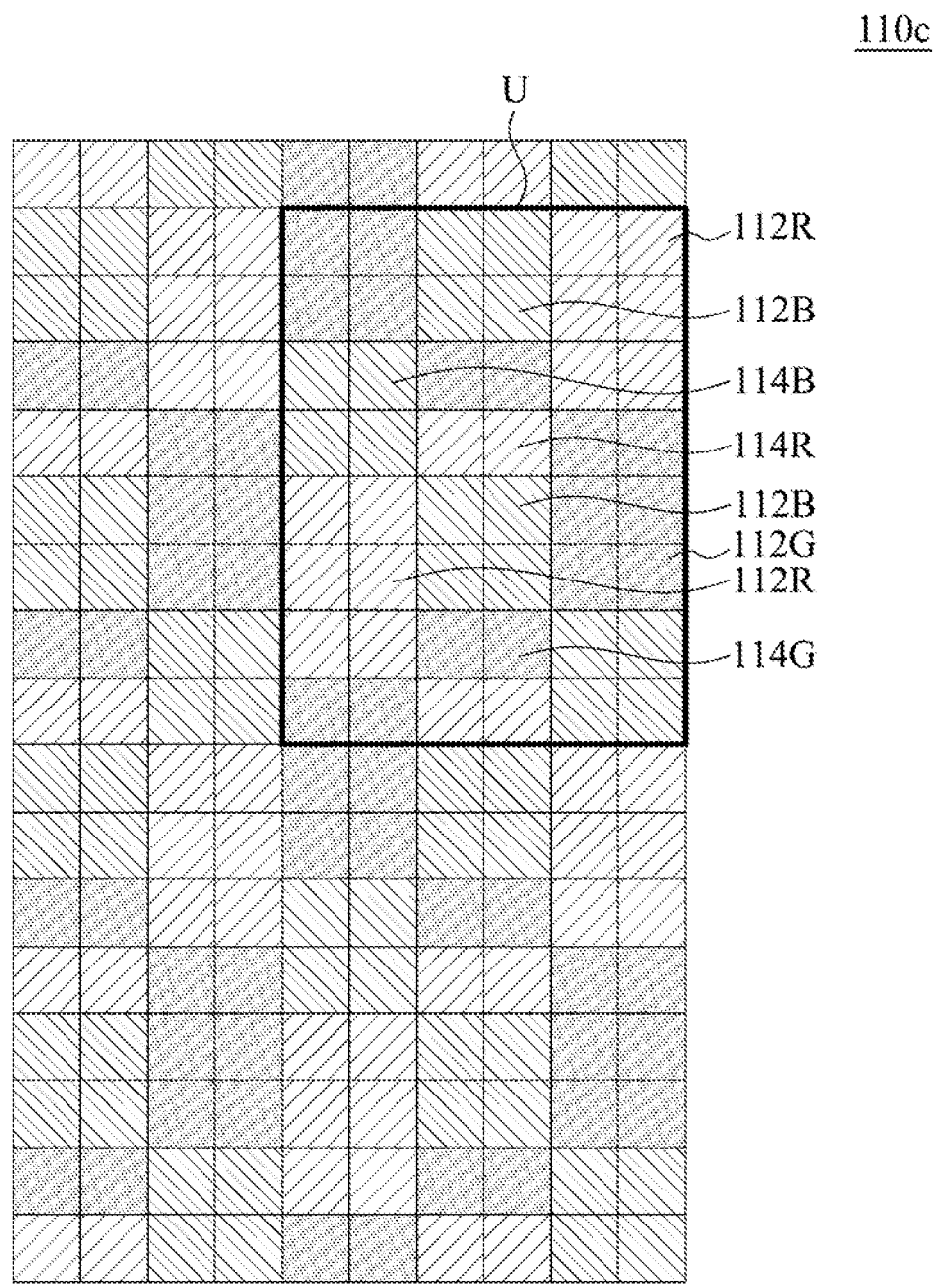
FIG. 6 is a top view of a color filter array according to one embodiment of the present disclosure.

FIG. 6 is a top view of a color filter array 100c according to one embodiment of the present disclosure. The color filter array 100c is substantially the same as the color filter array 110b, and the difference is that the areas of the first portions 112R, 112B, 112G of the color filter array 100c each correspond to six sub-pixel regions 102, and the first portions 112R, 112B, 112G are each arranged as a 3×2 array. The areas of the second portions 114R, 114B, 114G of the color filter array 100c each correspond to four sub-pixel regions 102, and the second portions 114R, 114b, 114G are each arranged as a 2×2 array. In other words, the first portions 112R, 112B, 112G and the second portions 114R, 114B, 114G can have different areas respectively. The color filter array 110c and the color filter array 110 have the same technique advantages, and the description will not be repeated hereinafter.

Figure 7:
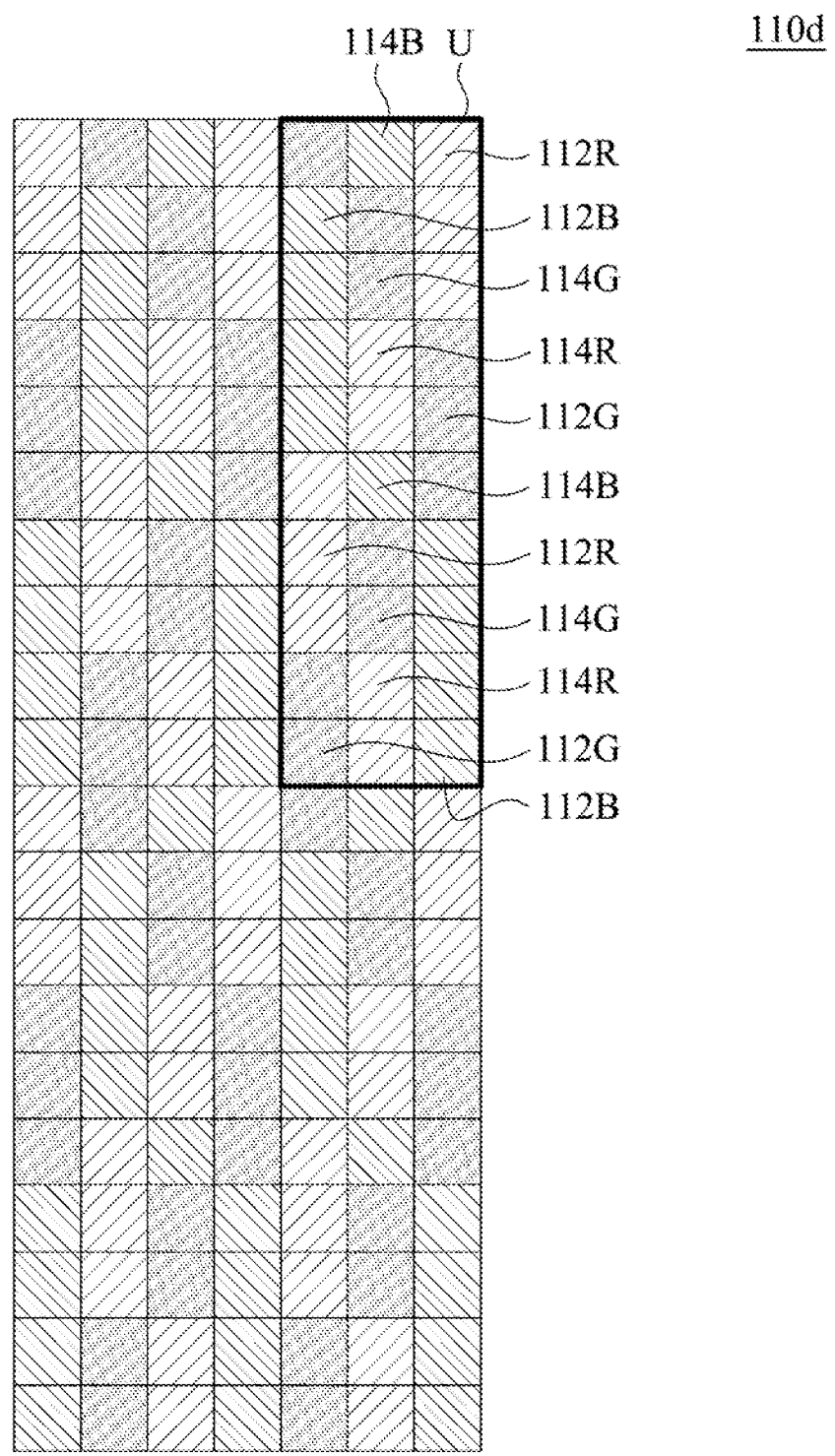
FIG. 7 is a top view of a color filter array according to one embodiment of the present disclosure.

FIG. 7 is a top view of a color filter array 100d according to one embodiment of the present disclosure. The areas of the first portions 112R, 112G of the color filter array 100d each correspond to four sub-pixel regions 102, and the first portions 112R, 112G are each arranged as a 3×1 array. The areas of the second portions 114R, 114B, 114G of the color filter array 100d each correspond to two sub-pixel regions 102, and the second portions 114R, 114B, 114G are each arranged as a 2×1 array. The area of the second portion 114b corresponds to one sub-pixel region 102. The color filter array 110d and the color filter array 110 have the same technique advantages, and the description will not be repeated hereinafter.

Figure 8:
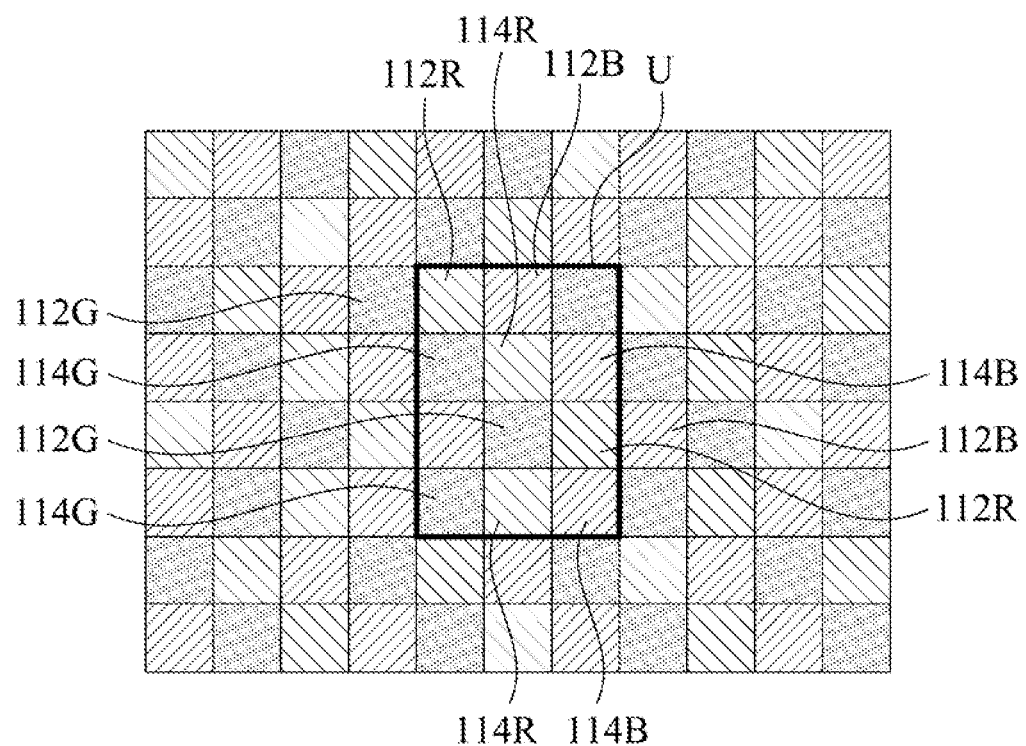
FIG. 8 is a top view of a color filter array according to one embodiment of the present disclosure.

FIG. 8 is a top view of a color filter array 110e according to one embodiment of the present disclosure. The first portions 112R, 112G, 112B and the second portions 114R, 114G, 114B of the color filter array 110e respectively correspond to one sub-pixel region 102. The color filter array 110e and the color filter array 110 have the same technique advantages, and the description will not be repeated hereinafter.

Figure 9:
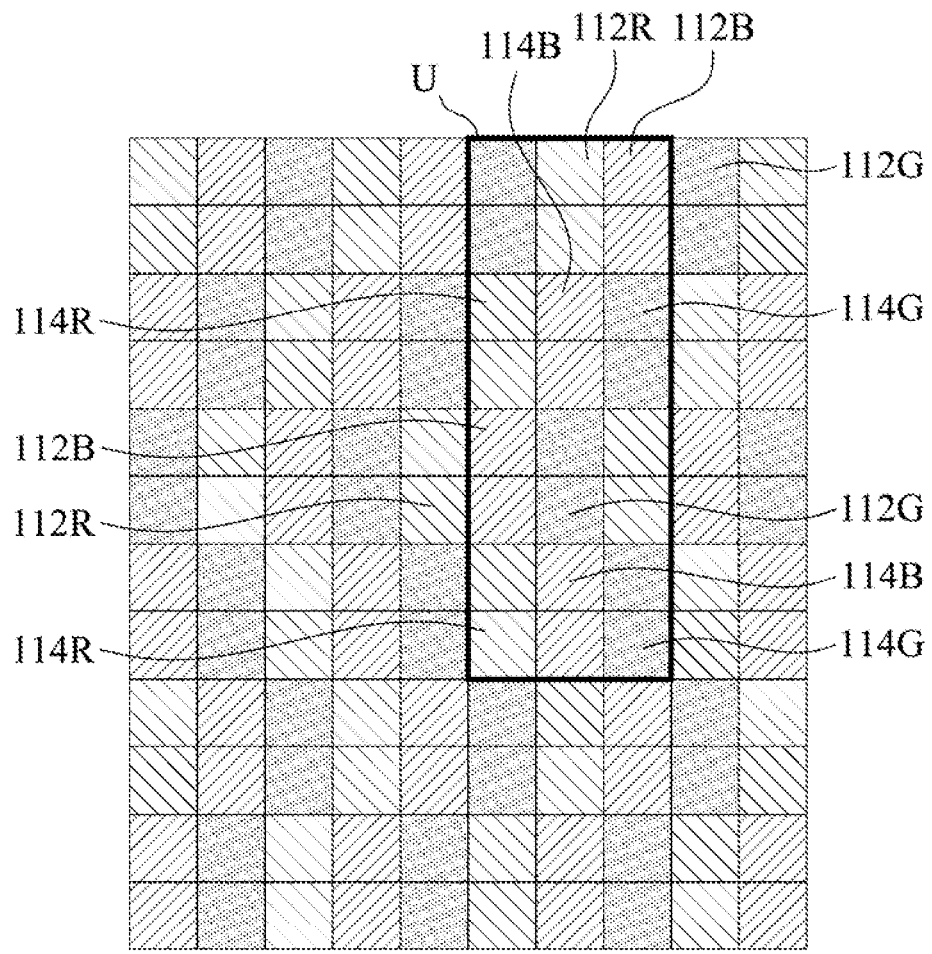
FIG. 9 is a top view of a color filter array according to one embodiment of the present disclosure.

FIG. 9 is a top view of a color filter array 100f according to one embodiment of the present disclosure. The first portions 112R, 112G, 112B and the second portions 114R, 114G, 114B of the color filter array 110f respectively correspond to two sub-pixel regions 102. The color filter array 110f and the color filter array 110 have the same technique advantages, and the description will not be repeated hereinafter.

FIG. 10 is a table of color performance of the color electrophoretic display 100 in FIG. 1 and control groups. The control group one and the control group two are conventional color electrophoretic displays. The color resist of the control group one has a long strip shape, and areas of color resists with different colors are the same. The area of a blue color resist is smaller than areas of a red color resist and a green color resist of the control group two. As shown by the blue color data, the b* value of the control group two is obviously lower than that of the control group one (i.e., blue color range is reduced), and the b* value of the color electrophoretic display 100 is similar to that of the control group one. The gamma value of the control group two is lower, and the gamma value of the color electrophoretic display 100 is similar to the gamma value of the control group one. The reflectance in white state of the control groups two is much higher, while the reflectance in white state of the color electrophoretic display 100 is similar to the reflectance in white state of the group one. Accordingly, the color gamut region and the white balance of a display can be maintained by using the color filter array having multiple sections arranged as a continuous S shape.

Based on contrast data, the contrast of the color electrophoretic display 100 is higher than contrasts of the control group one and the control group two. Accordingly, the overall brightness of the display screen can be improved by separating the color resists into multiple sections that are continuous without overlapping, and therefore the occurrence probability of textures that can be recognized by human eyes can be reduced. In addition the color difference and the NTSC color gamut range of the color electrophoretic display 100 are both in proper ranges.

In summary, the color gamut region and the white balance of a display can be maintained by using the color filter array having multiple sections arranged as a continuous S shape. The overall brightness of the display screen can be improved by separating the color resists into multiple sections that are continuous without overlapping, and the probability of showing a recognizable texture can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color filter array, comprising:
   a first color resist having a first color, wherein the first color resist comprises a plurality of sections;
   a second color resist having a second color different from the first color, wherein the second color resist comprises a plurality of sections; and
   a third color resist having a third color different from the first color and the second color, wherein the third color resist comprises a plurality of sections;
   wherein when viewed in a plan view, the sections of the first color resist collectively arranged as a continuous S shape, the sections of the second color resist collectively arranged as a continuous S shape, the sections of the third color resist collectively arranged as a continuous S shape, and a number of columns and a number of rows of at least one of the sections of the first color resist, the sections of the second color resist, and the sections of the third color resist are different, and the different number of rows and columns is 1×3 or 2×3.

2. The color filter array of claim 1, further comprising a plurality of rows arranged along a first direction and a plurality of columns arranged along a second direction, wherein the first direction is substantially perpendicular to the second direction;
   wherein the sections of the first color resist comprise two first portions and two second portions, the two first portions are at least located at a first column, the two second portions are respectively located at a second column and a third column corresponding to two opposite sides of the two first portions, and the sections of the first color resist are alternatively arranged along the first direction.

3. The color filter array of claim 2, wherein the two first portions and the two second portions are located at different rows respectively, and one of the two first portions is located between the two second portions.

4. The color filter array of claim 2, wherein each of the two second portions of the first color resist comprises a first side and a second side opposite to the first side and comprises a third side and a fourth side opposite to the third side, wherein the first side is in parallel with the second side along the second direction, and the third side is in parallel with the fourth side along the first direction;
wherein the two first portions of the first color resist are respectively located at a first corner and a second corner of one of the two second portions, the first corner is a junction between the first side and the third side of the aforesaid second portion, and the second corner is a junction between the first side and the fourth side of the aforesaid second portion.

5. The color filter array of claim 2, wherein each of the two first portions of the first color resist comprises a first side and a second side opposite to the first side and comprises a third side and a fourth side opposite to the third side, wherein the first side is in parallel with the second side along the second direction, and the third side is in parallel with the fourth side along the first direction;
wherein the two second portions of the first color resist are respectively located at a third corner and a fourth corner of one of the two first portions, the third corner is a junction between the second side and the third side of the aforesaid first portion, and the fourth corner is a junction between the first side and the fourth side of the aforesaid first portion.

6. The color filter array of claim 1, wherein the sections of the first color resist have a first total area, the sections of the second color resist have a second total area, and the first total area substantially equals to the second total area.

7. The color filter array of claim 6, wherein the sections of the first color resist comprise two first portions and two second portions, the sections of the second color resist comprise two first portions and two second portions, areas of the two first portions of the first color resist are different from areas of the two first portions of the second color resist.

8. A color electrophoretic display, comprising:
a display region comprising a plurality of sub-pixel regions;
a pixel array corresponding to the display region in position;
a display medium layer located on the pixel array; and
a color filter array, comprising:
a plurality of rows arranged along a first direction and a plurality of columns arranged along a second direction, wherein the first direction is substantially perpendicular to the second direction, and each of the sub-pixel regions are corresponds to the columns and the rows of the color filter array;
a first color resist having a first color, wherein the first color resist comprises a plurality of sections;
a second color resist having a second color different from the first color, wherein the second color resist comprises a plurality of sections; and
a third color resist having a third color different from the first color and the second color, wherein the third color resist comprises a plurality of sections;
wherein when viewed in a plan view, the sections of the first color resist collectively arranged as a continuous S shape, the sections of the second color resist collectively arranged as a continuous S shape, the sections of the third color resist collectively arranged as a continuous S shape, and a number of columns and a number of rows of at least one of the sections of the first color resist, the sections of the second color resist, and the sections of the third color resist are different, and the different number of rows and columns is 1×3 or 2×3.

9. The color electrophoretic display of claim 8, wherein the sections of the first color resist comprise two first portions and two second portions, an area of each of the two first portions is smaller than or equals to an area of each of the two second portions, and an orthogonal projection of each of the two first portions corresponds to one sub-pixel region.

10. The color electrophoretic display of claim 9, wherein the two first portions and the two second portions are located at different rows respectively, and one of the two first portions is located between the two second portions.

11. The color electrophoretic display of claim 9, wherein each of the two second portions of the first color resist comprises a first side and a second side opposite to the first side and comprises a third side and a fourth side opposite to the third side, wherein the first side is in parallel with the second side along the second direction, and the third side is in parallel with the fourth side along the first direction;
wherein the two first portions of the first color resist are respectively located at a first corner and a second corner of one of the two second portions, the first corner is a junction between the first side and the third side of the aforesaid second portion, and the second corner is a junction between the first side and the fourth side of the aforesaid second portion.

12. The color electrophoretic display of claim 9, wherein each of the two second portions of the first color resist comprises a first side and a second side opposite to the first side and comprises a third side and a fourth side opposite to the third side, wherein the first side is in parallel with the second side along the second direction, and the third side is in parallel with the fourth side along the first direction;
wherein the two second portions of the first color resist are respectively located at a third corner and a fourth corner of one of the two first portions, the third corner is a junction between the second side and the third side of the aforesaid first portion, and the fourth corner is a junction between the first side and the fourth side of the aforesaid first portion.

13. The color electrophoretic display of claim 8, wherein the sections of the first color resist comprise two first portions and two second portions, the two first portions are at least located at a first column, the two second portions are respectively located at a second column and a third column corresponding to two opposite sides of the two first portions, and the sections of the first color resist are alternatively arranged along the first direction.

14. The color electrophoretic display of claim 8, wherein the sections of the first color resist have a first total area, the sections of the second color resist have a second total area, and the first total area substantially equals to the second total area.

15. The color electrophoretic display of claim 14, wherein the sections of the first color resist comprise two first portions and two second portions, the sections of the second color resist comprise two first portions and two second portions, areas of the two first portions of the first color resist are different from areas of the two first portions of the second color resist.

* * * * *